United States Patent [19]
Yerkes

[11] Patent Number: 5,272,583
[45] Date of Patent: Dec. 21, 1993

[54] COLLAPSIBLE MAGNETIC TAPE CASSETTE

[76] Inventor: Craig H. Yerkes, 1501 Estancia Ave., Grants, N. Mex. 87020

[21] Appl. No.: 901,255

[22] Filed: Jun. 19, 1992

[51] Int. Cl.$^5$ .............................. S11B 23/06
[52] U.S. Cl. ....................................... 360/132
[58] Field of Search ..................... 360/132; 242/199

[56] References Cited
U.S. PATENT DOCUMENTS

| | | | |
|---|---|---|---|
| 4,969,612 | 11/1990 | Thomas | 242/199 |
| 5,114,092 | 5/1992 | Gelandi et al. | 360/132 X |
| 5,199,662 | 4/1993 | Klupt | 242/199 |
| 5,199,663 | 4/1993 | Klupt | 242/199 |

Primary Examiner—Richard E. Gluck
Attorney, Agent, or Firm—William E. Hein

[57] ABSTRACT

A collapsible magnetic tape cassette includes a housing having collapsible front, rear, and side panels that permit the housing to be presented in a collapsed, essentially flat form for storage, packaging, and mailing purposes and that also permit the user to later expand the housing to a normal erected form for playback purposes. A loop of magnetic tape is stored and guided within the cassette housing in a horizontal or flat position and is then guided to the vertical position as it exits the cassette housing during playback.

13 Claims, 2 Drawing Sheets

COLLAPSIBLE MAGNETIC TAPE CASSETTE

BACKGROUND AND SUMMARY OF THE INVENTION

This invention relates generally to tape cassettes of the type commonly employed to store audio, video or computer data information on magnetic tape for playback on an appropriate playback apparatus. More specifically, this invention relates to such a tape cassette that is capable of being collapsed to reduce the thickness of the cassette for mailing purposes.

Audio and/or video playback machines have become so common that most U.S. households now have at least one of those devices. Worldwide, the number of household cassette playback machines reaches into the millions. Thus, the potential is tremendous for companies who wish to reach these consumers through tape cassette advertising, whether it be by direct mailings, point of purchase displays or the printed media. However, the use of tape cassettes for advertising purposes is presently limited by the cost of packaging and mailing the rigid, bulky tape cassettes that are currently available.

It is therefore the principal object of the present invention to provide a magnetic tape cassette having a collapsible housing to reduce the thickness of the cassette, thereby minimizing mailing and storage costs.

This and other objects are accomplished in accordance with the illustrated preferred embodiment of the present invention by providing a housing with collapsible front, rear, and side walls that permit the housing to be presented in a collapsed, essentially flat form for storage, packaging, and mailing purposes and that also permit the user to later expand the housing to an erect form for playback purposes. A loop of magnetic tape is stored and guided within the cassette housing in a horizontal or flat position and is guided to the vertical position as it exits the cassette housing during playback so that the information stored thereon may be read by a conventional playback machine.

DESCRIPTION OF THE PREFERRED EMBODIMENT

Figure 1:
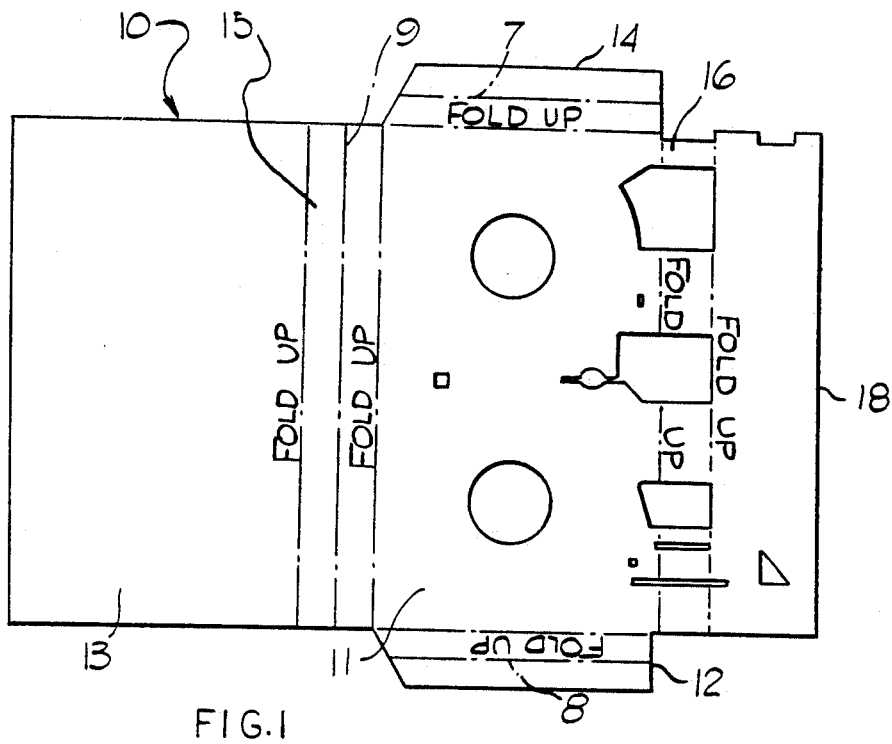
FIG. 1 is a diagram illustrating the pattern for fabricating the housing of the collapsible tape cassette of the present invention from a flat sheet of stock material.
Figure 2:
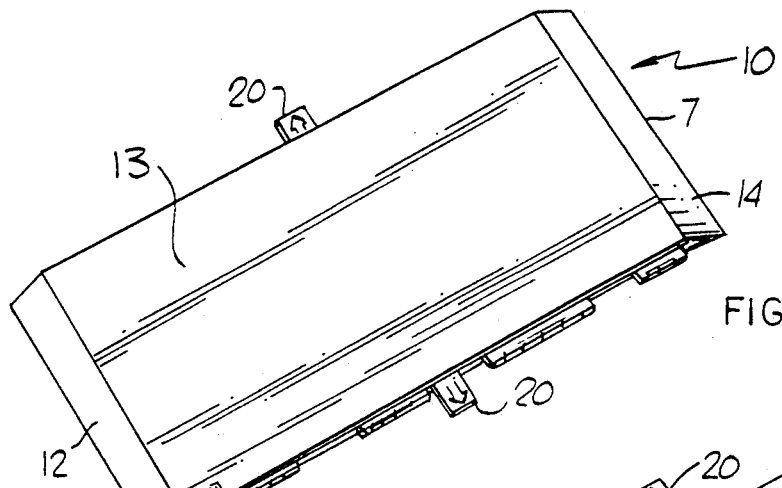
FIG. 2 is a pictorial illustration of the housing of the collapsible tape cassette of the present invention in its collapsed form.
Figure 3:
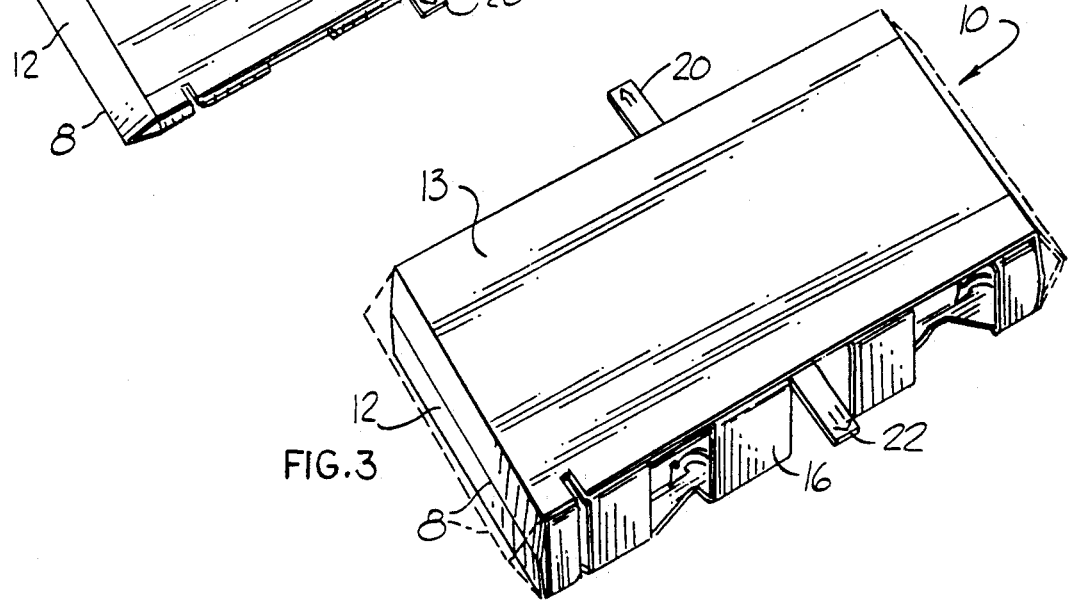
FIG. 3 is a pictorial diagram of the housing of the collapsible tape cassette of FIGS. 1 and 2 illustrating how the collapsible tape cassette is expanded for use from its fully collapsed form shown in FIG. 2 to its erected form.

Referring now to FIG. 1, there is shown a pattern that may be cut from a sheet of stock material and folded as indicated to form a housing 10 of the collapsible tape cassette of the present invention. Housing 10 includes a bottom panel 11, a top panel 13, left and right side panels 12 and 14, a rear panel 15, a front panel 16, and an interior panel 18. Bottom panel 11 and front panel 16 include a number of apertures generally shaped to correspond with similar apertures of a conventional rigid video tape cassette to permit tape access by the mechanism contained in an external playback machine. The left and right side panels 12, 14 and the rear panel 15 of housing 10 are each creased along lines 8, 7, 9, respectively, to facilitate flattening the tape cassette into the collapsed position illustrated in FIG. 2. A pair of tabs 20, 22 are removably attached to rear panel 15 and front panel 16, respectively. Tabs 20, 22 are provided to enable the user to expand housing 10 from the collapsed position illustrated in FIG. 2 to the erected position illustrated in FIG. 3 by simply pulling outwardly on each of the tabs. Tabs 20, 22 may simply be torn off the panels to which they were originally attached after the housing 10 has been erected preparatory to insertion into a playback machine. The sheet of stock material from which housing 10 is fabricated may comprise any of a number of commercially available plastic, cardboard or similar flexible materials. While, in the preferred embodiment, housing 10 is simply folded in accordance with the flat pattern of FIG. 1, it may as well be cast or otherwise fabricated as a single unit or from several components using conventional manufacturing processes.

Figure 4:
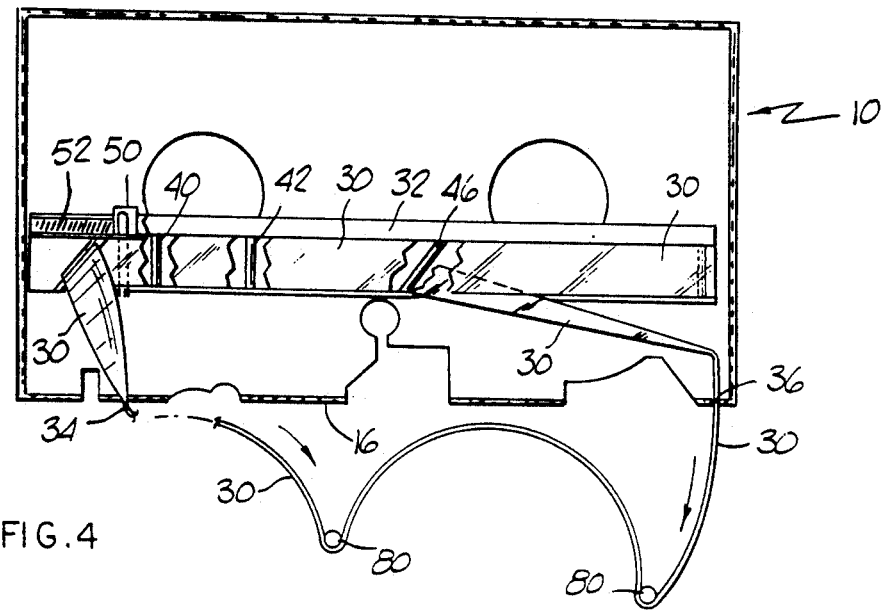
FIG. 4 is an interior plan view illustrating the way in which a loop of magnetic tape is retained in the horizontal or flat position within the housing of the collapsible tape cassette of FIGS. 1-3 and the way in which the loop of magnetic tape is guided to the vertical position when engaged by a playback machine at the time of playback.
Figure 5:
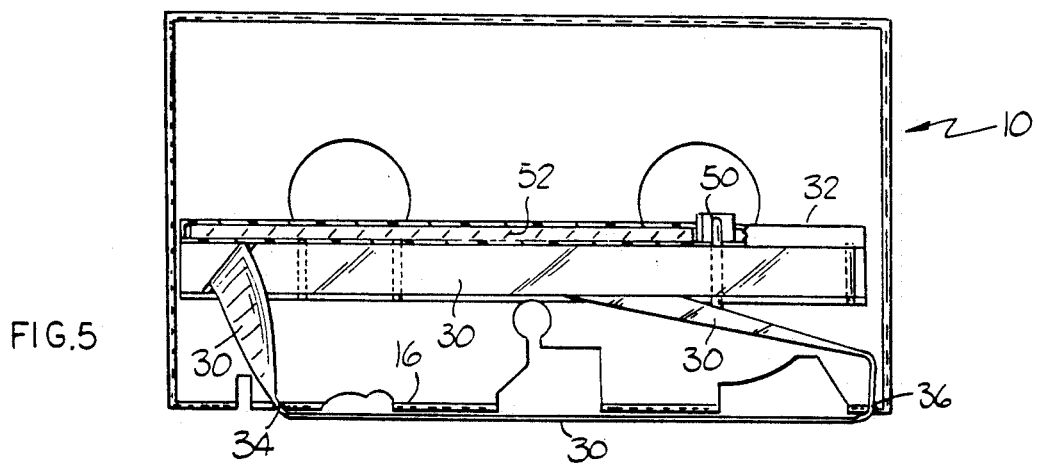
FIG. 5 is an interior plan view of the collapsible tape cassette of FIGS. 1-4 illustrating the way in which the loop of magnetic tape retained therein is retracted into the collapsible tape cassette when it is released by the playback machine following playback of the tape.
Figure 6:
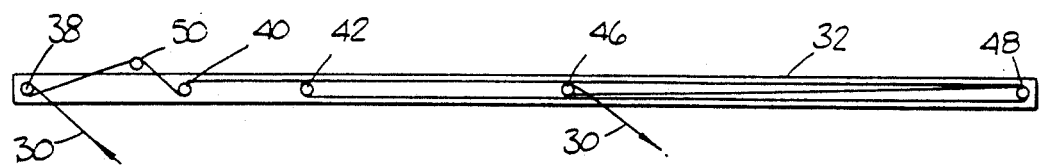
FIG. 6 is a diagram illustrating the path of the magnetic tape retained within the housing of the collapsible tape cassette of the present invention when the tape has been engaged by a playback machine, in accordance with FIG. 4.
Figure 7:
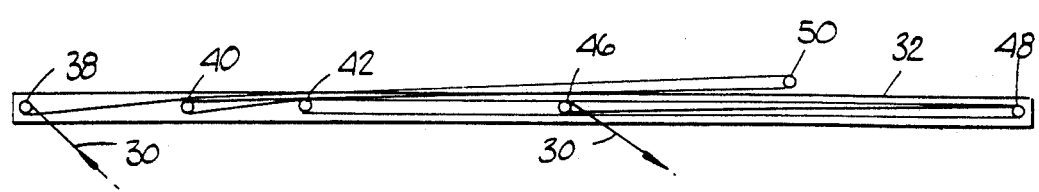
FIG. 7 is a diagram illustrating the path of the magnetic tape retained within the housing of the collapsible tape cassette of the present invention when the tape has been released by a playback machine, in accordance with FIG. 5.

The way in which a magnetic tape is retained within housing 10 of the collapsible tape cassette of the present invention, during playback, as well as during shipment and storage, may be understood with reference to FIGS. 4-7. A continuous loop of magnetic tape 30 is primarily retained within a generally flat tape holder 32 that is fixedly mounted on the bottom panel 11 of housing 10. A relatively short length of the loop of magnetic tape 30 resides outside the front panel 16 of housing 10, as illustrated in FIG. 5. The loop of magnetic tape 30 retained within tape holder 32 is always retained in a horizontal or flat position such that the plane of the tape is parallel to the bottom and top panels 11, 13 of housing 10. This arrangement, of course, differs completely from commonly used rigid tape cassettes in which the magnetic tape is retained within the tape cassette housing in the vertical position such that the plane of the tape is perpendicular to the top and bottom panels of the tape cassette housing. When the collapsible tape cassette of the present invention is in the erected position of FIGS. 3-5, the loop of magnetic tape 30 is guided, by means of guide slots 34, 36 in front panel 16, to the vertical position required for access by an external playback machine. When the collapsible tape cassette is in the collapsed position illustrated in FIG. 2, the front panel 16 of housing 10 folds inwardly so that the small length of magnetic tape illustrated in FIGS. 4 and 5 as being external to housing 10 then also lies horizontally, protected by the inwardly folded front panel 16. A number of fixed, horizontally positioned, roller guides 38, 40, 42, 46, 48 within tape holder 32 serve to define the path along which the loop of magnetic tape 30 is stored when the collapsible tape cassette is in the collapsed position. This is also the path along which the loop of magnetic tape 30 is routed during playback when the collapsible tape cassette has been expanded into its erected position. A sliding horizontal roller guide 50 operates against a spring 52 that is captive within a longitudinal slot along a rear edge of tape holder 32 to take up slack in the loop of magnetic tape 30 when it is released by the external playback machine.

Referring specifically to FIG. 4, when the collapsible tape cassette of the present invention is inserted into an external playback machine and playback of the loop of magnetic tape 30 is initiated, a pair of prongs 80 of the playback machine pulls a length of the loop of magnetic tape 30 from tape holder 32. This action by the playback machine causes sliding roller guide 50 to be urged, against the pressure of spring 52, to the position shown in FIG. 4. When playback has been completed, the loop of magnetic tape 30 outside of the housing 10, as illustrated in FIG. 4, is released by the playback machine, and the pressure of spring 52 then urges sliding roller guide 50 to the position illustrated in FIG. 5. This action of sliding roller guide 50 serves to pull the slack tape released by the playback machine into a taut position adjacent front panel 16, as also illustrated in FIG. 5.

As an alternative to the combination of tape holder 32 and associated tape guides 38, 40, 42, 46, 48, 50 described above, a reel-to-reel arrangement may be employed that results in the magnetic tape being stored within housing 10 in the horizontal position described above that will also permit housing 10 to be collapsed for more efficient storage and mailing than is possible with current rigid tape cassettes.

I claim:

1. A magnetic tape cassette expandable from a collapsed form of minimum height for storage and shipping to an erected form of normal height for use with a playback machine, the magnetic tape cassette comprising:
   a housing comprising spaced apart top and bottom panels, left and right side panels, a rear panel, and a front panel, said left and right side panels and said rear panel each being connected to said top and bottom panels and each being adjustable in height, said front panel being hingedly attached to said bottom panel for motion between a vertical position when said magnetic tape cassette is in said erected form and an inwardly directed, substantially horizontal position when said magnetic tape cassette is in said collapsed form, said front panel including a tape entry aperture and a tape exit aperture; and
   tape holder means positioned within said housing and attached to said bottom panel, said tape holder means being operative for storing a substantial portion of a continuous loop of magnetic tape in a horizontal position such that the plane of the magnetic tape is parallel to said top and bottom panels, said tape holder means including tape guide means for guiding said loop of magnetic tape to a vertical position for exiting said housing at said tape exit aperture and for guiding said loop of magnetic tape to the horizontal position following entry into said housing at said tape entry aperture.

2. A magnetic tape cassette as in claim 1 wherein said left and right side panels and said rear panel are each formed to flex along a horizontal line intermediate their height to permit said magnetic tape cassette to be expanded and collapsed.

3. A magnetic tape cassette as in claim 1 wherein:
   said tape guide means comprises a plurality of fixed guide rollers defining a tape storage path; and
   said tape holder means further comprises a spring-loaded sliding roller guide for eliminating slack in said loop of magnetic tape that occurs when said magnetic tape cartridge is removed from said playback machine.

4. A magnetic tape cassette as in claim 1 wherein said housing comprises a cardboard material.

5. A magnetic tape cassette as in claim 1 wherein said housing comprises a plastic material.

6. A magnetic tape cassette as in claim 1 wherein said housing is folded from a flat sheet of stock material.

7. A magnetic tape cassette as in claim 4 wherein said housing is folded from a flat sheet of stock material.

8. A magnetic tape cassette as in claim 1 wherein said continuous loop of magnetic tape comprises video tape.

9. A magnetic tape cassette as in claim 1 wherein said continuous loop of magnetic tape comprises audio tape.

10. A magnetic tape cassette as in claim 1 wherein said continuous loop of magnetic tape comprises computer tape.

11. A magnetic tape cassette as in claim 1 wherein said front and rear panels each include tab means adapted for being grasped by the user to expand said magnetic tape cartridge from said collapsed form to said erected form.

12. A magnetic tape cassette as in claim 11 wherein each of said tab means is detachable from said front and rear panels following expansion of said magnetic tape cartridge to said erected form.

13. A method for preparing a collapsible magnetic tape cassette for use with a playback machine, the method comprising:
   providing a magnetic tape cassette having a housing expandable in height from a collapsed form of minimum height for storage and shipping to an erected form of normal height for use with said playback machine;
   storing a substantial portion of a continuous loop of magnetic tape within said housing in, a horizontal position;
   expanding said housing to said erected form; and
   guiding said continuous loop of magnetic tape stored within said housing in said horizontal position to a vertical position for exiting said housing at a tape exit aperture therein and guiding said continuous loop of magnetic tape to said horizontal position following entry into said housing at a tape entry aperture therein.

* * * * *